United States Patent Office 2,759,557
Patented Aug. 21, 1956

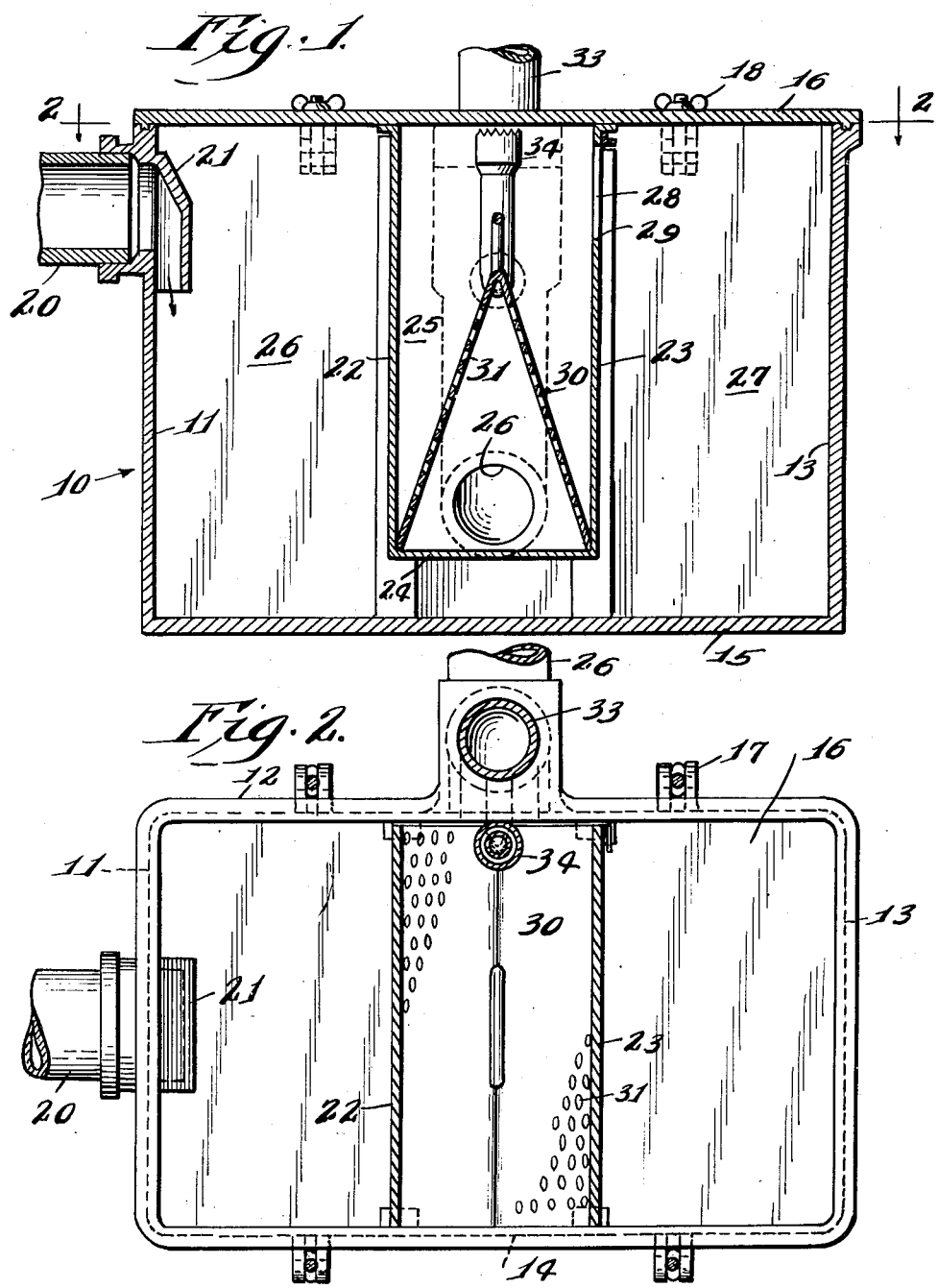

2,759,557

FLOW CONTROL MEANS FOR SEPARATION APPARATUS

Arthur Gordon, Chicago, Ill.

Application June 11, 1952, Serial No. 292,931

4 Claims. (Cl. 182—9)

This invention relates to separation apparatus and more particularly to liquid flow control means for a separation apparatus.

It is the general object of this invention to produce a new and improved separation apparatus including flow control means.

Separators for handling effluent or waste discharge products from sewage systems or factory waste products have been used for a number of years. Where used for handling ordinary household sewage, such separators are designed to permit the breakdown of the solid constituents of the effluent by bacteriological action so as to cause the effluent to be purified thereby rather than to permit it to putrefy which would occur under certain conditions. Such installations may consist of a single container or of a series of containers and for reference to various types of separators reference is made to my Patents Nos. 2,561,507, 1,959,623 and 2,070,202.

The separators shown and described in said patents operate extremely efficiently under all normal operating conditions. Occasionally, however, abnormal conditions occur in which a great deal of effluent is discharged within a relatively short period. The occurrence of abnormal conditions of the type described has a tendency to "flush" the separator system with a resulting loss in the efficiency of the apparatus. In industrial installations were the separator is used to remove grease or other waste materials the discharge of an excessive quantity of liquid thereinto has a tendency to flush grease into the city sewage system and thus gives rise to conditions tending to clog the system.

I have found that it is possible to eliminate the difficulties referred to above by providing the separator with flow control means to limit the discharge of liquid from the saparator to a predetermined maximum. I have further found that greatly increased efficiency of operation can be achieved by locating such flow control means at the outlet from the separator and thus the flow control means are contained within the separation apparatus. By so providing a flow control means any excessive amounts of fluid are retained within the separator which may have a sufficient excess capacity to handle such excessive flows and when so retained do not flush the system before permitting the separator to perform its complete function of separating greases, for example, from the liquid or permitting the proper breakdown of solids by bacterial action. Preferably the flow control means takes the form of a screen adjacent the outlet with the screen being provided with openings for the flow of liquid therethrough and with the openings being so proportioned as to pass only a certain flow per minute or per hour. Thus the openings may be so proportioned as to pass, for example, not more than 100 gallons per hour of liquid and regardless of the inflow into the separator, which at times may exceed 100 gallons per hour, the outflow therefrom is maintained at or below the predetermined maximum.

Other features and objects of the invention will be readily apparent from the following description and drawings, in which:

Fig. 1 is a vertical section through a separation apparatus embodying the invention; and Fig. 2 is a horizontal section taken along line 2—2 of Fig. 1.

While this invention is susceptible of embodiments in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

Referring now to the drawings, the separator consists of a substantially rectangular casing 10 having side walls 11, 12, 13 and 14, a bottom 15 and a removable top 16. The top is provided with four pairs of ears 17 engageable by wing nuts 18 secured to the side walls for holding the cover securely in place.

An inlet 20 is located near the upper portion of the side wall 11 and opens thereinto, with the flow through the inlet being directed downwardly as indicated by the arrow by a baffle plate 21 thereover. The separator is divided into a plurality of compartments by a pair of baffle walls 22 and 23 which extend downwardly from the top of the container toward but not quite to the bottom thereof and which extend transversely from side to side. The lower ends of the baffle plates are joined by a substantially horizontal plate 24 to form therewith an outlet compartment 25 in which an outlet 26 is located.

Liquid entering the separator through the inlet 20 is directed downwardly into the inlet compartment 26 and thence flows below the horizontal plate 24 and into an intermediate compartment 27. The baffle wall 23 is provided near its top with a grate 28 over the lip 29 of which fluid may flow into the outlet compartment.

Located in the outlet compartment is a substantially V-shaped screen 30 which is provided with a plurality of openings 31 to permit liquid which enters the outlet compartment to flow therethrough and into the outlet 26. The areas of the openings 31 are so proportioned as to limit the flow to the outlet to a predetermined maximum amount. Thus regardless of the quantity of flow into the separator only a predetermined maximum flow is permitted to reach the outlet. With the openings in the screen so designed, the total area thereof is no greater than the area of the outlet opening 26 and is preferably less than the area of the outlet opening to provide a proper control. While it is possible to control the outflow from the separator by reducing the size of the outlet 26 rather than by reducing the area of the openings 30, it has been found that more efficient operation of the separation apparatus occurs when the excess flow is restricted to the inlet and intermediate compartments and that part of the outlet compartment above the screen rather than by permitting the excessive flow to fill the separator all the way to the outlet opening itself.

If desired, the separator may be provided with a vent pipe 33 and a suitable suction breaker 34 in the outlet compartment and connected thereto to prevent siphoning of the separator in certain installations.

From the foregoing it will be evident that liquid introduced into the separator is retained therein for a minimum predetermined length of time. Thus, for example, if the flow capacity of the screen is 100 gallons per hour and the flow into the separator is less than that amount, the outflow will be in the same rate as the inflow. If, however, liquid is introduced into the separator at a rate greater than 100 gallons per hour, the excess over the predetermined maximum flow will be retained in the separator, with the separator of course being provided with sufficient excess capacity to handle any expected high volume flow. Outflow from the separator will continue at 100 gallons per hour until the excess of flow has been disposed of and thus the liquid is retained therein at least long enough to permit operation of the separator in an efficient manner.

Thus, in the particular embodiment shown, the regulation of effluent movement through the separator is accomplished by the V filter screen which is located near the end of effluent travel in its path of movement through the unit, which path is determined by the construction of the separator, and the control screen is located below the grease line of the trap and below the vent line of the trap. Due to the construction and location of the various parts of the separator, there is never an acceleration in the velocity of flow through any part of the separator equaling the velocity through the inlet pipe. Thus solid materials separated are not disturbed by the movement of effluent through the separator, and there is no apparent movement thereof during operation of the unit.

I claim:

1. A separation apparatus for use in a waste disposal system comprising a container having a top, a bottom and side walls joining the top and bottom, an inlet to the container located in the upper portion of one of the side walls, an outlet from the container located in the lower portion of one of the side walls, baffle walls within the container and dividing the same into a plurality of compartments through which liquid is guided from the inlet to the outlet including an outlet compartment formed by said baffle walls, and a screen in said outlet compartment and provided with a plurality of evenly distributed, uniform size openings for flow of all liquid therethrough to the outlet with the sum of the area of said openings being less than the area of the inlet.

2. A separation apparatus for use in a waste disposal system comprising a container having a top, a bottom and side walls joining the top and bottom, an inlet to the container located in the upper portion of one of the side walls, an outlet from the container located in the lower portion of one of the side walls, baffle walls within the container and dividing the same into a plurality of compartments through which liquid is guided from the inlet to the outlet including an outlet compartment formed by said baffle walls, and a screen in said outlet compartment and provided with a plurality of evenly spaced, uniform size openings for flow of liquid therethrough to the outlet with said openings having a predetermined total area to limit the total liquid flow from the outlet compartment to the outlet to a maximum predetermined rate less than the flow capacity of the inlet.

3. A separation apparatus for use in a waste disposal system comprising a substantially rectangular container have a top, a bottom and side walls joining the top and bottom, an inlet to the container located in the upper portion of one of the side walls, a pair of spaced vertical baffle walls extending across the container from the top thereof toward the bottom with the lower ends of the baffle walls being spaced above the bottom to divide the container into a plurality of compartments, a horizontal plate joining the lower ends of the baffle walls to form therewith another compartment, an outlet in said other compartment, means forming an opening for the passage of liquid from one of the first mentioned compartments into said other compartment, and a screen in said other compartment intermediate said opening and the outlet, said screen having a plurality of evenly spaced uniform size openings therethrough having a total area less than the area of the outlet to limit the total liquid flow to the outlet to a predetermined maximum rate less than the flow capacity of the inlet.

4. A separation apparatus for use in a waste disposal system comprising means forming a container, an inlet to and an outlet from the container, means in the container and dividing the same into a plurality of compartments through which liquid is guided from the inlet to the outlet, and a screen covering the outlet, said screen having a plurality of evenly distributed, uniform size openings therethrough having a total area less than the area of the outlet to limit the total liquid flow to the outlet to a predetermined maximum rate less than the flow capacity of the inlet.

References Cited in the file of this patent

UNITED STATES PATENTS

| | | |
|---|---|---|
| 952,620 | Keyes | Mar. 22, 1910 |
| 1,648,708 | Wilkinson | Nov. 8, 1927 |
| 1,883,720 | Grimes | Oct. 18, 1932 |
| 2,118,157 | Camp | May 24, 1938 |
| 2,201,282 | Arndt | May 21, 1940 |
| 2,216,300 | Shenk | Oct. 1, 1940 |
| 2,369,194 | Weber | Feb. 13, 1945 |
| 2,464,976 | Gordon | Mar. 22, 1949 |
| 2,479,386 | Matheis | Aug. 16, 1949 |